(12) United States Patent
Gaertner

(10) Patent No.: US 10,036,369 B2
(45) Date of Patent: Jul. 31, 2018

(54) PISTON PUMP

(71) Applicant: Robert Bosch GmbH, Stuttgart (DE)

(72) Inventor: Oliver Gaertner, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 14/885,997

(22) Filed: Oct. 17, 2015

(65) Prior Publication Data

US 2016/0108900 A1 Apr. 21, 2016

(30) Foreign Application Priority Data

Oct. 17, 2014 (DE) .................. 10 2014 221 097

(51) Int. Cl.
| | | |
|---|---|---|
| *F04B 49/18* | (2006.01) | |
| *F04B 7/00* | (2006.01) | |
| *F04B 53/10* | (2006.01) | |
| *F04B 53/14* | (2006.01) | |
| *F04B 1/04* | (2006.01) | |
| *F04B 5/00* | (2006.01) | |
| *F04B 3/00* | (2006.01) | |
| *F04B 49/08* | (2006.01) | |

(52) U.S. Cl.
CPC .......... *F04B 7/0061* (2013.01); *F04B 1/0408* (2013.01); *F04B 1/0421* (2013.01); *F04B 49/18* (2013.01); *F04B 53/1032* (2013.01); *F04B 53/14* (2013.01); *F04B 1/0426* (2013.01); *F04B 3/003* (2013.01); *F04B 5/00* (2013.01); *F04B 49/08* (2013.01)

(58) Field of Classification Search
CPC .... F04B 1/0408; F04B 1/0421; F04B 1/0426; F04B 3/003; F04B 5/00; F04B 49/18
See application file for complete search history.

(56) References Cited

U.S. PATENT DOCUMENTS

| | | | | |
|---|---|---|---|---|
| 3,112,705 | A * | 12/1963 | Chlebowski | B66F 3/42 417/214 |
| 5,542,827 | A * | 8/1996 | Dombek | F02M 37/16 417/486 |
| 6,161,466 | A * | 12/2000 | Schuller | B60T 8/4031 417/470 |
| 9,175,676 | B2 * | 11/2015 | Fortin | F04B 9/14 |
| 2010/0098567 | A1 * | 4/2010 | Zimmermann | B60T 8/4031 417/546 |
| 2014/0165984 | A1 * | 6/2014 | Colby | F41B 11/723 124/73 |

FOREIGN PATENT DOCUMENTS

DE 199 02 018 A1 7/2000

* cited by examiner

*Primary Examiner* — Charles Freay
*Assistant Examiner* — Thomas Fink
(74) *Attorney, Agent, or Firm* — Maginot, Moore & Beck LLP

(57) ABSTRACT

A piston pump for a traction-controlled hydraulic vehicle braking system includes a pump piston and an annular piston that is arranged as a second piston in a resiliently loaded manner on the pump piston. As the delivery pressure increases, a resilient element is compressed and a stroke of the second piston is shortened so as to reduce a delivery quantity. This configuration enables a higher delivery pressure to be achieved for a given driving force. With low delivery pressure, the pump piston and the second piston deliver together so as to achieve a rapid build-up of pressure.

12 Claims, 1 Drawing Sheet

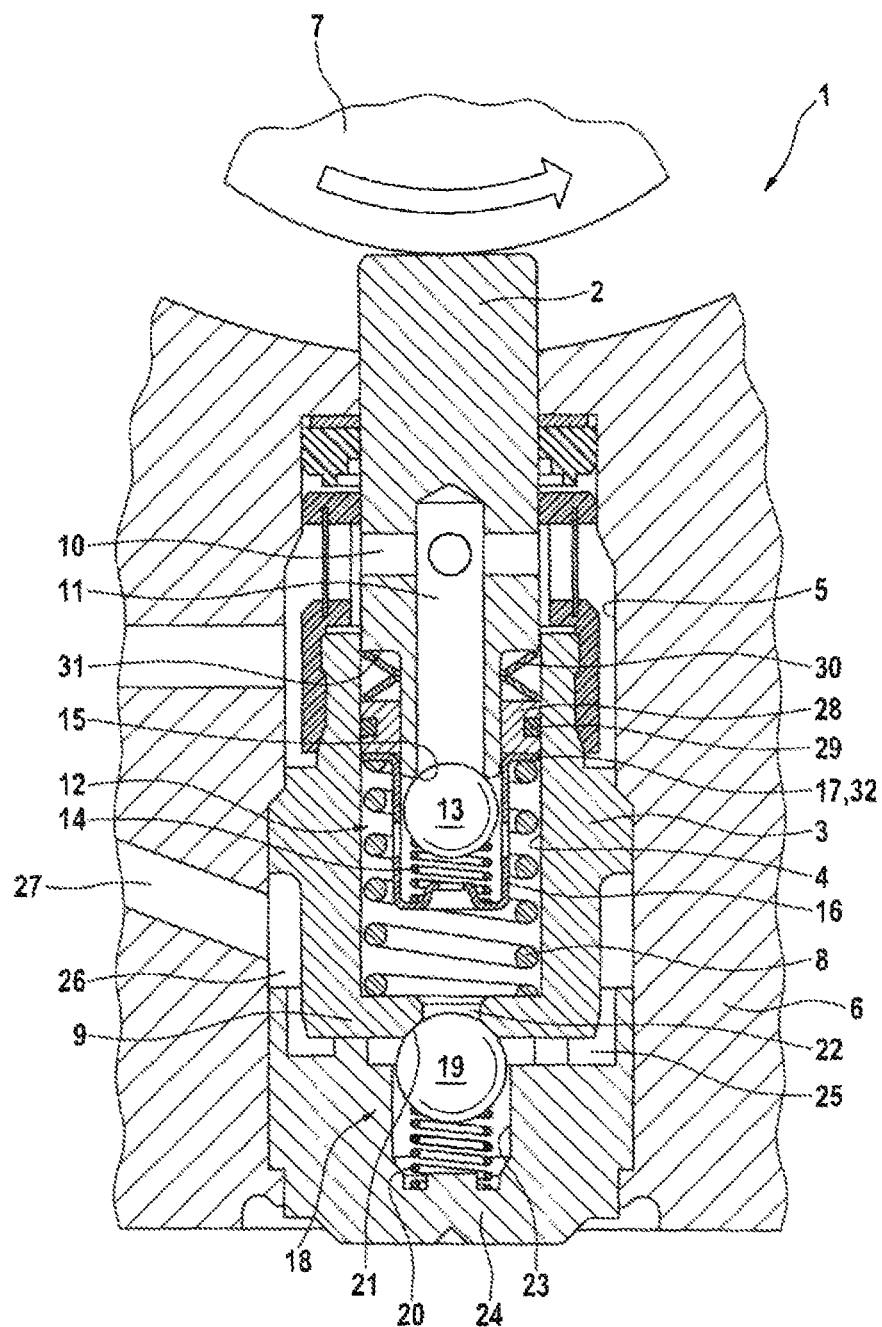

PISTON PUMP

This application claims priority under 35 U.S.C. § 119 to patent application no. DE 10 2014 221 097.6, filed on Oct. 17, 2014 in Germany, the disclosure of which is incorporated herein by reference in its entirety.

BACKGROUND

The disclosure relates to a piston pump for a hydraulic vehicle braking system having the features of the disclosure. The piston pump is provided in particular for producing a braking pressure or for recirculating brake fluid in the direction of a main brake cylinder in traction-controlled hydraulic vehicle braking systems, wherein such pumps are also referred to as recirculation pumps, or for producing a brake pressure in an electrohydraulic, that is to say, external power vehicle braking system, wherein the piston pump can also be used for a slip control system in the latter case. The piston pump can also be referred to as a pump element of a piston pump, in particular a multi-piston pump.

Such piston pumps are known and they conventionally have a pump piston and a pump chamber whose cross-section is congruent with a cross-section of the pump piston, that is to say, it is generally circular. The pump piston can be displaced in the pump chamber in an axial or generally longitudinal direction and can be driven—conventionally with a cam—to carry out a back and forth stroke movement in the longitudinal direction of the pump chamber. As a result of the stroke movement, in a manner known per se, with a suction stroke, fluid, braking fluid in the case of a hydraulic vehicle braking system, is drawn in and displaced with a delivery stroke out of the pump chamber, that is to say, the fluid is conveyed using the piston pump. A through-flow direction of the piston pump is controlled with an inlet valve and an outlet valve which are generally non-return valves. The pump chamber is often also referred to as a cylinder or cylinder bore; it may, for example, be an inner space of a liner which is pressed into a hole of a hydraulic block which receives other hydraulic components of a slip control system, such as solenoid valves, or the pump chamber is formed directly by a hole in such a hydraulic block. The pump chamber may also be formed in a cylinder or a pump housing of the piston pump. The listing is exemplary and not definitive. An example of such a piston pump is disclosed in patent application DE 199 02 018 A1.

For various slip control systems, in particular for an electronic stability program/electronic stability control or an automatic braking system for preventing an approach right up to a vehicle travelling in front or a stationary vehicle or any other obstacle or person, a very rapid response of one, more or all wheel brakes of a vehicle is important, which requires a pump with a large delivery volume. As the delivery pressure increases, that is to say, as the pressure at the outlet of the piston pump increases, a drive torque and a driving power of the piston pump increase. So that the piston pump does not stop as the delivery pressure increases, it requires a drive motor, generally an electric motor, with a correspondingly high torque and great driving power, that is to say, a large and heavy motor. Furthermore, an electronic control device has to be configured for a high electrical power consumption of such a drive motor.

SUMMARY

The piston pump according to the disclosure has a pump piston which can be driven to carry out a stroke movement and a second piston which can be moved in the stroke direction with respect to the pump piston and which is supported in the direction of a delivery stroke by means of a resilient element on the pump piston. At a low delivery pressure, the second piston also moves by means of its support with the resilient element on the pump piston with the pump piston, and therefore both pistons deliver or displace. As the delivery pressure increases, the resilient element is compressed so that the second piston does move with the pump piston, but with a shorter stroke. The larger the delivery pressure of the pump piston is, the more the resilient element is compressed during the delivery stroke and the more the stroke of the auxiliary piston is shortened. At a high delivery pressure, the second piston may remain stationary, that is to say, it no longer also moves with the pump piston. The delivery pressure up to which the second piston also moves with the pump piston, to what extent the stroke of the second piston is shortened as the delivery pressure increases and where applicable from which delivery pressure the second piston remains stationary and no longer also moves with the pump piston are dependent on a structural configuration of the piston pump. The configuration parameters are inter alia piston faces of the two pistons, a resilient rigidity and resilient characteristic line of the resilient element and also the type of the resilient element.

The shortening of the stroke of the second piston as the delivery pressure increases generally results in a reduction of a delivery volume of the second piston and consequently also a delivery volume of the piston pump. The reduced delivery volume as the delivery pressure increases reduces an increase of a drive force which is required to drive the pump piston, which at the same time also results in an increase of drive energy and drive power of the pump piston of the piston pump according to the disclosure. The piston pump according to the disclosure has the advantage of a large delivery volume at low delivery pressure and a reduced drive force, drive energy and drive power as the delivery pressure increases, whereby a higher delivery pressure is possible with a given motor power.

The dependent claims relate to advantageous embodiments and developments of the disclosure.

BRIEF DESCRIPTION OF THE DRAWING

The disclosure is explained in greater detail below with reference to an embodiment which is illustrated in the drawing. The single FIGURE shows an axial section of a piston pump according to the disclosure.

DETAILED DESCRIPTION

The piston pump 1 according to the disclosure illustrated in the drawings has a pump piston 2 which is received in an axially displaceable manner in an inner space of a liner 3, which space can also be referred to as a pump chamber and which is referred to in this instance as a cylinder bore 4. The liner 3 is pressed into a receiving hole 5 of a hydraulic block 6 of which a portion which surrounds the piston pump 1 is illustrated in the drawing. The hydraulic block 6 and the piston pump 1 are components of a hydraulic unit which is not further illustrated and which is used for slip control in a hydraulic vehicle braking system. Such hydraulic units and hydraulic blocks 6 for slip control systems of vehicle braking systems are known. In the hydraulic block 6, other hydraulic components (not illustrated), such as solenoid valves, non-return valves, hydraulic accumulators and damper chambers are installed and hydraulically connected to each other by means of bores of the hydraulic block 6. Such slip control systems always comprise per se an anti-lock braking system and nowadays in most cases also a traction control system and an electronic stability control system which is commonly also referred to as an anti-skid system. The abbreviations ABS, TCS, ESC, ESP are commonly used for these control systems. Other brake control systems which are possible with such hydraulic units are automatic braking operations, for example, to control spacing with respect to a vehicle in front and to prevent driving into an obstacle or persons. The hydraulic units have one or more piston pumps 1 for each brake circuit.

In order to drive the pump piston 2, the piston pump 1 has a cam 7 which is arranged at an end face of the pump piston 2 and whose periphery the pump piston 2 abuts with the end face thereof. A rotation axis of the cam 7 intersects with an axis of the pump piston 2 in a radial manner. The cam 7 can be rotatably driven by means of an electric motor which is not illustrated and which is fitted to an outer side of the hydraulic block 6 with the same axis as a rotation axis of the cam 7. The electric motor may also be referred to as a pump motor. A gear mechanism may be arranged between the electric motor and the cam 7. A rotary drive of the cam 7 about the rotation axis thereof which is eccentric with respect to the cam brings about a stroke movement of the pump piston 2 axially back and forth in the cylinder bore 4. A piston spring 8 which is arranged at a side of the pump piston 2 opposite the cam 7 in the cylinder bore 4 acts on the pump piston 2 with the end face thereof against the periphery of the cam 7. The piston spring 8 is supported on the base 9 of the liner 3. In the embodiment, one the piston springs is a helical pressure spring, but this is not necessary for the disclosure. Even a lifting drive of the pump piston 2 without any spring is possible.

In order to introduce fluid which has to be delivered with the piston pump 1, that is to say, brake fluid in the embodiment, the pump piston 2 has mutually intersecting radial holes 10 which intersect with an axial blind hole 11 close to the closed end thereof. The blind hole 11 opens into the cylinder bore 4 at an end face of the pump piston 2 remote from the cam 7. At the end face which is remote from the cam 7 and which is located in the cylinder bore 4 in the liner 3, the pump piston 2 has an inlet valve 12. In the embodiment of the disclosure illustrated and described, the inlet valve 12 is a resiliently loaded non-return valve which can be flowed through in the direction of the cylinder bore 4. The non-return valve/inlet valve 12 has a ball as a blocking member 13, which is pressed by a valve spring 14 against a valve seat 15 which is constructed at an opening of the axial blind hole 10 of the pump piston 2. The valve spring 14 is supported on a base of a valve cage 16, in which the valve spring 14 and the blocking member 13 are received and which is arranged at the end of the pump piston 2, which end is remote from the cam 5 and which is located in the cylinder bore 4. The valve cage 16 has a radial flange 17 against which the piston spring 8 presses.

The piston pump 1 also has as an outlet valve 18 a resiliently loaded non-return valve with a ball as a blocking member 19 and a helical pressure spring as a valve spring 20 which presses the blocking member 19 against a valve seat 21 which is constructed on a center hole 22 and at an outer side of the base 9 of the liner 3. The valve spring 20 and the blocking member 19 of the outlet valve 18 are arranged in an axial blind hole 23 of a closure 24 which is pressed and caulked in an opening of the receiving hole 5 in the hydraulic block 6. The closure 24 closes the receiving hole 5 in a pressure-tight manner and retains the liner 3 in the receiving hole 5. Between the closure 24 and the base 9 of the liner 3, there is a gap 25 which opens in an annular space 16 which surrounds the liner 3 close to the base 9 thereof in the receiving hole 5 in the hydraulic block 6 and in which an outlet hole 27 opens in the hydraulic block 4.

Non-return valves are not necessary for the disclosure, other valves are also possible as an inlet and/or outlet valve 12, 18 and a different arrangement of the valves is also possible.

The piston pump 1 has a second piston 28 which in the described and illustrated embodiment of the disclosure is constructed as an annular piston and which can be displaced in an axial direction, that is to say, in the stroke direction on the pump piston 1. The second piston 28 is sealed with a sealing ring 29 in the liner 3. Another seal for sealing the second piston 28 on the pump piston 2 may be provided (not illustrated). The second piston 28 is supported by means of a resilient element 30 on an annular step 31 of the pump piston 2 in the direction of a delivery stroke. The delivery stroke is directed away from the cam 7 and in the direction of the base 9 of the liner 3. In the event of a delivery stroke, the pump piston 2 and the second piston 28 reduce a volume of the cylinder bore 4 and displace brake fluid through the outlet valve 18. In the direction of the delivery stroke, a displacement path of the second piston 28 on the pump piston 2 is limited by a path limitation 32 which is formed by the radial flange 17 of the valve cage 16 of the inlet valve 12. The resilient element 30 of the second piston 28 in the embodiment of the disclosure illustrated and described is formed by a disc spring assembly, other types of spring being possible.

With a low delivery pressure or a low pressure in the pump outlet, the resilient element 30 supports the second piston 28 in a rigid manner on the pump piston 2 so that the second piston 28 also moves with the pump piston 2 and the piston pump 1 delivers with a full cross-section of the pump piston 2 and the second piston 28. A rapid build-up of brake pressure is thereby possible.

If the delivery pressure or the pressure in the pump outlet increases, the resilient element 30 is redirected during the stroke movement of the pump piston 2 so that the stroke of the second piston 28 is shortened. With the shortening of the stroke of the second piston 28, as the delivery pressure increases, a delivery volume of the second piston 28 and consequently the piston pump 1 decreases. A higher delivery pressure of the piston pump 1 with a given maximum drive force for the stroke movement of the pump piston 2 is thereby achieved. The shortening of the stroke of the second piston 28 can lead to a standstill of the second piston 28, that is to say, the second piston 28 no longer moves with the pump piston 2 but instead remains in the liner 3.

What is claimed is:

1. A piston pump for a hydraulic vehicle braking system, comprising:
    a hydraulic block including an inlet chamber and an intermediate chamber, the intermediate chamber separated from the inlet chamber depending on a position of an inlet valve disposed therebetween;
    a pump piston configured to be driven to carry out a stroke movement, the pump piston (i) having an end portion that defines an annular step facing in the direction of a delivery stroke and (ii) defining a passage configured to fluidically connect the inlet chamber to the intermediate chamber;
    a second piston disposed on the end portion of the pump piston, the second piston configured to be moved in the stroke direction with respect to the pump piston; and a resilient element disposed on the end portion of the pump piston against the annular step, the resilient element configured to support the second piston in the direction of the delivery stroke, wherein the inlet valve includes a radial flange configured to cooperate with the second piston in at least one operating state, the pump piston extending beyond at least one of the radial flange and the second piston in the direction of the delivery stroke.

2. The piston pump according to claim 1, wherein the radial flange defines a path limitation that limits a displacement path of the second piston with respect to the pump piston in the direction of the delivery stroke.

3. The piston pump according to claim 1, wherein the second piston is an annular piston that is displaceably arranged on the pump piston.

4. The piston pump according to claim 1, wherein the resilient element is a single disc spring.

5. The piston pump according to claim 1, wherein the resilient element is a disc spring assembly.

6. The piston pump according to claim 1, wherein the second piston in a first operating state moves with the pump piston when the pump piston carries out the stroke movement.

7. The piston pump according to claim 6, wherein the second piston in a second operating state is fixed with respect to the hydraulic block when the pump piston carries out the stroke movement.

8. The piston pump according to claim 7, wherein the second piston in a third operating state moves relative to the pump piston and the hydraulic block when the pump piston carries out the stroke movement.

9. The piston pump according to claim 2, wherein the passage of the pump piston includes at least one radial hole that opens to the inlet chamber and an axial blind hole that is fluidically connected to the at least one radial hole and opens to the intermediate chamber.

10. The piston pump according to claim 9, wherein the inlet valve includes a blocking member biased against the axial blind hole.

11. The piston pump according to claim 2, further comprising a piston spring disposed in the intermediate chamber between an end face of the intermediate chamber and the radial flange, the piston spring configured to act on the pump piston in the direction of a suction stroke via the inlet valve.

12. The piston pump according to claim 1, wherein the second piston is biased by the resilient element against an end face of the radial flange in the at least one operating state.

* * * * *